United States Patent
Hiben et al.

(10) Patent No.: US 12,401,418 B2
(45) Date of Patent: Aug. 26, 2025

(54) LOW EARTH ORBIT SATELLITE COMMUNICATION USING DEVICE DIVERSITY RECEPTION AND TRANSMISSION

(71) Applicant: MOTOROLA SOLUTIONS, INC., Chicago, IL (US)

(72) Inventors: Bradley M. Hiben, Glen Ellyn, IL (US); Gregory J. Buchwald, Crystal Lake, IL (US); Melanie A. King, Wesley Chapel, FL (US); Patrick D. Koskan, Jupiter, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 361 days.

(21) Appl. No.: 18/182,039

(22) Filed: Mar. 10, 2023

(65) Prior Publication Data
US 2024/0305365 A1    Sep. 12, 2024

(51) Int. Cl.
*H04B 7/195* (2006.01)
*H04B 7/185* (2006.01)
(Continued)

(52) U.S. Cl.
CPC ......... *H04B 7/195* (2013.01); *H04B 7/18539* (2013.01); *H04B 17/3913* (2015.01); *H04W 84/18* (2013.01); *H04W 88/04* (2013.01)

(58) Field of Classification Search
CPC .............. H04B 17/318; H04B 17/3913; H04B 7/18513; H04B 7/18539; H04B 7/195; H04W 40/12; H04W 84/18; H04W 88/04
See application file for complete search history.

(56) References Cited

U.S. PATENT DOCUMENTS 6,169,881 B1 * 1/2001 Astrom .............. H04B 7/18519
455/430
6,826,514 B1 * 11/2004 Antico ............... H04B 7/18573
702/187

(Continued)

FOREIGN PATENT DOCUMENTS

| CN | 118102265 A | * | 5/2024 |
| WO | 2021244908 A1 | | 12/2021 |
| WO | 2022246762 A1 | | 12/2022 |

OTHER PUBLICATIONS

International Search Report and Written Opinion for Application No. PCT/US2024/015384 dated Oct. 22, 2024 (12 pages).

(Continued)

*Primary Examiner* — Shah M Rahman
(74) *Attorney, Agent, or Firm* — Michael Best & Friedrich LLP (57) ABSTRACT

A system for low earth orbit (LEO) satellite communication. In one example, the system includes a control computer and a workgroup including a plurality of communication devices. Each communication device includes an electronic processor configured to establish a wireless network connection with the control computer, determine connectivity data associated with a signal between the communication device and a first LEO satellite, and transmit the connectivity data to the control computer via the wireless network connection. The control computer is configured to receive the connectivity data from each communication device, and select a first one of the plurality of communication devices as a primary communication device based on each of the connectivity data. The primary communication device is configured to receive media from a different one of the plurality of communication devices via the wireless network connection and transmit the media to the first LEO satellite.

20 Claims, 6 Drawing Sheets

(51) Int. Cl.
*H04B 17/391* (2015.01)
*H04W 84/18* (2009.01)
*H04W 88/04* (2009.01)

(56) References Cited

U.S. PATENT DOCUMENTS

| | | | |
|---|---|---|---|
| 10,848,936 | B2 | 11/2020 | Bhaskaran et al. |
| 11,894,899 | B1* | 2/2024 | Wang ............... H04B 7/0617 |
| 2002/0059320 | A1* | 5/2002 | Tamaru ............... E01C 19/00 |
| 2009/0021424 | A1* | 1/2009 | Wahlberg ........... H04B 7/18536 |
| | | | 342/352 |
| 2010/0036604 | A1 | 2/2010 | O'Connell et al. |
| 2010/0265842 | A1* | 10/2010 | Khandekar ........... H04W 72/29 |
| | | | 370/252 |
| 2018/0109991 | A1* | 4/2018 | Whelan ............... H04W 40/22 |
| 2018/0302770 | A1* | 10/2018 | Bhaskaran ........... H04W 76/14 |
| 2020/0284883 | A1* | 9/2020 | Ferreira ............... G01S 7/4815 |
| 2021/0274414 | A1* | 9/2021 | Määttanen ........... H04W 76/11 |
| 2022/0108521 | A1* | 4/2022 | Sameer ............... G06T 19/00 |
| 2022/0183055 | A1* | 6/2022 | Rune ............... H04W 76/10 |
| 2022/0312301 | A1 | 9/2022 | Christopherson et al. |
| 2023/0134701 | A1* | 5/2023 | Åström ............... G01S 19/06 |
| | | | 342/357.64 |
| 2023/0209417 | A1* | 6/2023 | Bharadwaj ......... H04B 7/18541 |
| | | | 370/331 |
| 2023/0268985 | A1* | 8/2023 | Sotoudeh ........... H04B 7/18541 |
| | | | 375/262 |
| 2024/0088993 | A1 | 3/2024 | Yu et al. |
| 2024/0171266 | A1* | 5/2024 | Beale ............... H04B 7/18519 |
| 2024/0187090 | A1* | 6/2024 | Wu ............... H04B 7/18545 |

OTHER PUBLICATIONS

Xiaomi, "Clarification to services provided by 5G system with satellite access," 3GPP TSG-SA1 Meeting #94e, S1-211108, May 2021, 5 pages.

* cited by examiner

LOW EARTH ORBIT SATELLITE COMMUNICATION USING DEVICE DIVERSITY RECEPTION AND TRANSMISSION

BACKGROUND

Low earth orbit (LEO) satellite communication systems, otherwise referred to as device-to-satellite communication systems, enable terrestrial wireless communication devices to operate in off-terrestrial network scenarios (e.g., in rural areas without reliable terrestrial cellular networks). Reliability of LEO satellite communication is constrained by link budgets. Link budgets are an accounting of all power gains and losses that a communication signal experiences in a telecommunication system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features that include the claimed subject matter, and explain various principles and advantages.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding the embodiments, examples, aspects, and features described and illustrated so as not to obscure the disclosure with details that will be readily apparent to those of ordinary skill in the art having the benefit of the description herein.

DETAILED DESCRIPTION

Link margin is the amount by which the received power of a signal exceeds the sensitivity of a receiver (e.g., a satellite). However, if the link margin of a communication link is sufficiently large, the communication link will be useful for sending data. Link budgets in many low earth orbit (LEO) satellite communication systems are typically constrained such that satellite-to-device communications are limited to minimally-occurring, non-realtime text messages. For example, terrestrial communication devices communicating with LEO satellites typically must be in open areas (e.g., open fields) without line-of-sight (LoS) obstructions between the communication device and the satellite in order to achieve a sufficient link margin. Additionally, a LEO satellite is typically only within range of a particular communication device for approximately 3-5 minutes at a time. In some instances, a user may be required to point the communication device in a particular direction (e.g., towards the satellite) in order to achieve a sufficient link margin for sending data to the satellite.

To address, among other things, these problems, systems and methods are provided herein for device diversity reception and transmission in a device-to-satellite communication system. Among other things, examples described herein provide a system for low earth orbit (LEO) satellite communication. The system includes a control computer and a workgroup including a plurality of communication devices. Each respective communication device of the plurality of communication devices includes an electronic processor configured to establish a wireless network connection with the control computer, determine connectivity data associated with a signal between the respective communication device and a first LEO satellite, and transmit the connectivity data to the control computer via the wireless network connection. The control computer is configured to receive the connectivity data from each communication device of the plurality of communication devices, and select a first one of the plurality of communication devices as a primary communication device based on each of the connectivity data. The primary communication device is configured to establish a communication link with the first LEO satellite, receive media from a different one of the plurality of communication devices via the wireless network connection, and transmitting the media to the first LEO satellite.

In some aspects, the control computer is included in at least one of the plurality of communication devices.

In some aspects, selecting the first one of the plurality of communication devices as the primary communication device includes determining, based on the connectivity data, that the first one of the plurality of communication devices is in a field of view of the first LEO satellite.

In some aspects, the control computer is further configured to periodically receive connectivity data updates from each communication device of the plurality of communication devices, store each of the connectivity data updates, predict future connectivity data for each communication device of the plurality of communication devices based on the connectivity data updates, and select a second one of the plurality of communication devices as an upcoming primary communication device based on the future connectivity data.

In some aspects, the future connectivity data includes a predicted visibility time of a second LEO satellite to the upcoming primary communication device, and the control computer is further configured to transmit a command to the upcoming primary communication device to establish a communication link with the second LEO satellite.

In some aspects, the connectivity data includes at least one selected from the group consisting of a signal strength of the signal between the respective communication device and the first LEO satellite, a quality of service (QoS) of the signal between the respective communication device and the first LEO satellite, an estimated remaining connection time with the first LEO satellite, and obstruction data.

In some aspects, the control computer is further configured to select a second one of the plurality of communication devices as a secondary communication device based on the connectivity data, periodically receive connectivity data updates from the plurality of communication devices, determine, based on the connectivity data updates, whether the QoS between the primary communication device and the first LEO satellite meets a QoS threshold, in response to determining, based on the connectivity data, that the QoS between the primary communication device and the first LEO satellite is below the QoS threshold, select the secondary communication device as the primary communication device.

In some aspects, selecting the secondary communication device as the primary communication device includes transmitting a command to the secondary communication device to establish a communication link with a second LEO satellite, wherein the secondary communication device is in a field of view of the second LEO satellite.

In some aspects, the wireless network connection includes at least one selected from the group consisting of a Wi-Fi connection, a Bluetooth connection, an 802.15.4g connection, a land mobile radio (LMR) connection, an ultra-wideband (UWB) connection, and a long term evolution (LTE) direct connection.

In some aspects, the plurality of communication devices includes a camera-equipped communication device, the camera-equipped communication device includes a camera configured to capture image data of an environment surrounding the camera-equipped communication device, and the control computer is configured to receive, from the camera-equipped communication device, sensor data based on the image data, and determine a satellite line-of-sight (LoS) obstruction based on the sensor data.

In some aspects, the satellite line-of-sight obstruction includes a predicted satellite LoS obstruction, and the control computer is configured to predict a path of the first LEO satellite and determine the predicted satellite LoS obstruction based on a predicted path of the first LEO satellite.

In some aspects, the control computer is configured to in response to determining the satellite LoS obstruction, determine, based on the image data and a predicted path of the first LEO satellite, an unobstructed location, and transmit a message to the primary communication device, the message including instructions for a user of the primary communication device to move to the unobstructed location.

In some aspects, the control computer is configured to predict a path of a second LEO satellite, and in response to determining the satellite LoS obstruction, determine, transmit a command to the primary communication device to establish a communication link with the second LEO satellite.

In some aspects, the control computer is configured to in response to determining the satellite LoS obstruction, select a second one of the plurality of communication devices as an upcoming primary communication device.

Another example provides, a method for low earth orbit (LEO) satellite communication. The method includes establishing, with each respective communication device of a plurality of communication devise, a wireless network connection with a control computer, determining, with each respective communication device of a plurality of communication devices, connectivity data associated with a signal between the respective communication device and a first LEO satellite, and transmitting, with each respective communication device of the plurality of communication devices, the connectivity data to the control computer via the wireless network connection. The method also includes receiving, with the control computer, the connectivity data from each communication device of the plurality of communication devices, and selecting, with the control computer, a first one of the plurality of communication devices as a primary communication device based on each of the connectivity data. The method further includes establishing, with the primary communication device, a communication link with the first LEO satellite, receiving, with the primary communication device, media from a different one of the plurality of communication devices via the wireless network connection, and transmitting, with the primary communication device, the media to the first LEO satellite.

In some aspects, the control computer is included in at least one of the plurality of communication devices.

In some aspects, selecting the first one of the plurality of communication devices as the primary communication device includes determining, based on the connectivity data, that the first one of the plurality of communication devices is in a field of view of the first LEO satellite.

In some aspects, the method further includes periodically receiving, with the control computer, connectivity data updates from each communication device of the plurality of communication devices, storing, with the control computer, each of the connectivity data updates, predicting with the control computer, future connectivity data for each communication device of the plurality of communication devices based on the connectivity data updates, and selecting with the control computer, a second one of the plurality of communication devices as an upcoming primary communication device based on the future connectivity data.

In some aspects, the future connectivity data includes a predicted visibility time of a second LEO satellite to the upcoming primary communication device, and the method further comprises transmitting, with the control computer, a command to the upcoming primary communication device to establish a communication link with the second LEO satellite.

In some aspects, the connectivity data includes at least one selected from the group consisting of a signal strength of the signal between the respective communication device and the first LEO satellite, a quality of service (QoS) of the signal between the respective communication device and the first LEO satellite, an estimated remaining connection time with the first LEO satellite, and obstruction data.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should be understood that although certain figures presented herein illustrate hardware and software located within particular devices, these depictions are for illustrative purposes only. In some examples, the illustrated components may be combined or divided into separate software, firmware, and/or hardware. For example, instead of being located within and performed by a single electronic processor, logic and processing may be distributed among multiple electronic processors. Regardless of how they are combined or divided as shown and unless the context clearly indicates otherwise, hardware and software components may be located on the same computing device or may be distributed among different computing devices connected by one or more networks or other suitable communication links.

Figure 1:
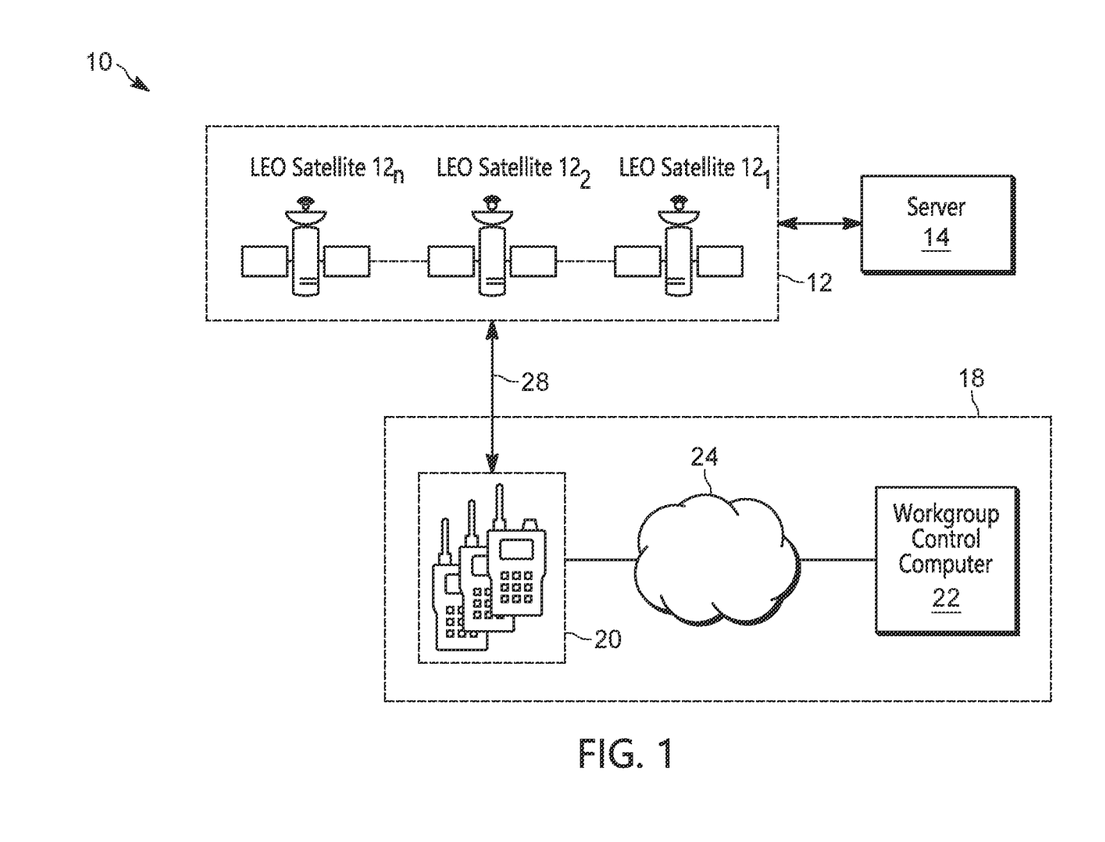
FIG. 1 illustrates a system for low earth orbit (LEO) satellite communication, according to some aspects.

FIG. 1 illustrates an example system 10 for LEO satellite communication, according to some aspects. The system 10 may be implemented in an environment out of range of radio or cell towers or may be implemented in an environment where cellular network signals and/or radio signals are unreliable. The system 10 includes one or more LEO satellites 12, for example, LEO satellites $12_{1, 2, \ldots, n}$, configured to orbit around the earth with a period of, for example, 128 minutes or less. The system 10 illustrated includes three LEO satellites but may include a different number of LEO satellites. For example, the system 10 may include a constellation of 10 satellites, 30 satellites, 60 satellites, or another suitable number of satellites. Some or all of the LEO satellites 12 may be in communication with each other via an inter-satellite link (ISL). In some instances, some or all of the LEO satellites 12 also communicate with a cloud-based server 14.

In the example shown, the system 10 also includes a communication group, or workgroup 18, having a plurality of communication devices 20 and a workgroup control computer 22. The plurality of communication devices 20 included in the workgroup 18 may be, for example, communication devices used by first responders (for example, fire fighters, police officers, and paramedics, among others) for communicating with one another and with a dispatcher. The plurality of communication devices 20 may include one or more radios (e.g., land mobile radios (LMRs)), one or more mobile phones, and/or other communication devices capable of wireless communication. In the illustrated example, the plurality of communication devices 20 includes three communication devices, however, the plurality of communication devices 20 may include more than three communication devices or less than three communication devices. In some instances, the number of communication devices included in the workgroup 18 is dependent on the separation between each of the communication devices with one another. For example, each of the plurality of communication devices 20 may be within a range of one another such that each of the plurality of communication devices 20 is operable to join a wireless network 24 via wireless network connection.

The wireless network 24 may be a short-range wireless network enabling each of the plurality of communication devices 20 to communicate with one another in the absence of a cellular network. The wireless network 24 may include, for example, a Wi-Fi network, a Bluetooth network, an 802.15.4g network, a land mobile radio (LMR) network, an ultra-wideband (UWB) network, a long term evolution (LTE) direct network (e.g., LTE proximity services (ProSe) network), and/or another network. Thus, the wireless network connection may include, for example, a Wi-Fi connection, a Bluetooth connection, an 802.15.4g connection, a land mobile radio (LMR) connection, an ultra-wideband (UWB) connection, a LTE direct network (e.g., a LTE ProSe connection), and/or other wireless network connections. Some or all of the communication devices included in the plurality of communication devices 20 may be further configured to establish a satellite communication link 28 with one or more of the LEO satellites 12.

Figure 2:
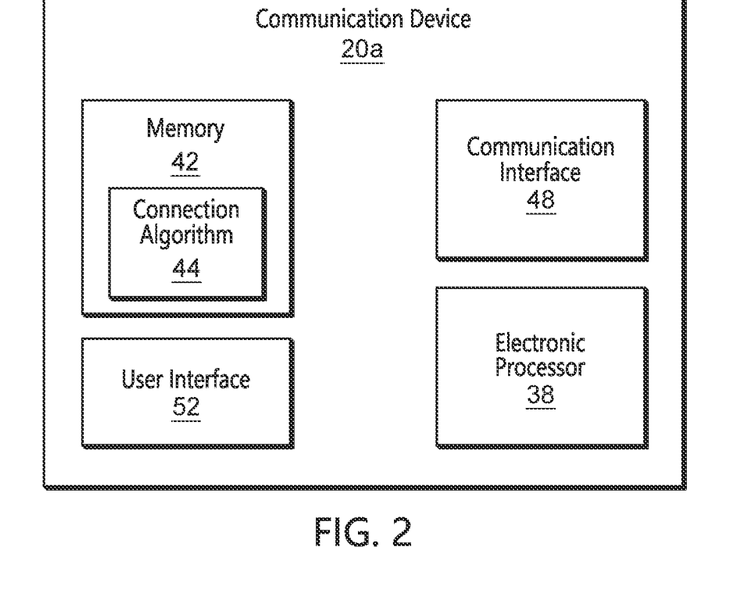
FIG. 2 illustrates a communication device included in the system of FIG. 1, according to some aspects.

FIG. 2 schematically illustrates an example communication device 20a that may be included in the plurality of communication devices 20, according to some aspects. In the example illustrated, the communication device 20a includes an electronic processor 38 (for example, a microprocessor or other electronic device). The electronic processor 38 is electrically coupled to a memory 42, a communication interface 48, and a user interface 52. The communication device 20a may include fewer or additional components in configurations different from that illustrated in FIG. 2. For example, the communication device 20a may additionally include a push-to-talk button. The user interface 52 may include, for example, a camera, a push-to-talk button, a keyboard, a keypad, one or more speakers, a microphone, a display, and/or other input and output devices. In some examples, the communication device 20a includes a location component (for example, a global positioning system receiver) configured to determine the geographic coordinates of the location of the communication device 20a. In some examples, the communication device 20a performs functionality other than the functionality described below.

The memory 42 may include read only memory (ROM), random access memory (RAM), other non-transitory computer-readable media, or a combination thereof. In the example shown, the memory 42 stores a connection algorithm 44 executable by the electronic processor 38 for performing methods described herein.

The communication interface 48 sends and receives data to and from (for example, via an antenna) other devices in the system 10 over the wireless network 24. The communication interface 48 is also operable to send and receive data to and from the LEO satellites 12 over the satellite communication link 28. The electronic processor 38 is configured to transmit and receive (for example, via the communication interface 48 and the antenna) media (for example, a video stream, audio stream, an image, a text message, sensor input data gathered by one or more sensors of the communication device 20a, and the like) to and from a different one of the plurality of communication devices 20, the workgroup control computer 22, and/or a LEO satellite 12. Similarly, the electronic processor 38 may output media received from a different one of the plurality of communication devices 20, the workgroup control computer 22, and/or a LEO satellite 12 through the user interface 52 or a combination thereof.

The electronic processor 38 transmits connectivity data to the workgroup control computer 22. The connectivity data includes, for example, a signal strength of a signal between the communication device 20a and a LEO satellite 12, a quality of service (QoS) of a signal between the communication device 20a and the LEO satellite 12, a duration of connection time with the LEO satellite 12, an estimated remaining connection time with the LEO satellite 12, information related to a LoS obstruction with the LEO satellite 12, and/or other information associated with connectivity to the LEO satellite 12. In some instances, some or all of the connectivity data is included in the media transmitted from the communication device 20a to the workgroup control computer 22. In some instances, the workgroup control computer 22 extrapolates the connectivity data based on a quality of the media, a duration of the media, metadata included in the media, and/or the contents of the media.

Figure 3:
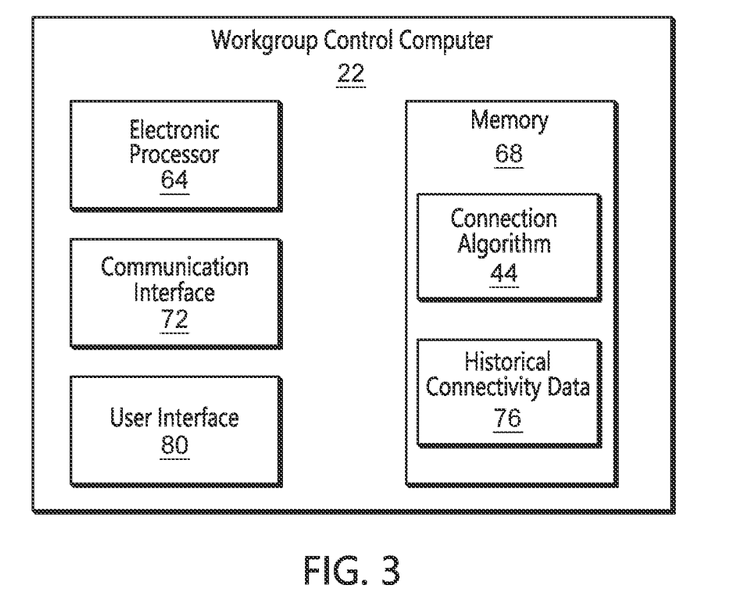
FIG. 3 illustrates a workgroup control computer included in the system of FIG. 1, according to some aspects.

FIG. 3 schematically illustrates an example of the workgroup control computer 22, according to some aspects. The workgroup control computer 22 includes, for example, electronic processor 64 electrically coupled to a memory 68 and a communication interface 72. The memory 68 may include read only memory (ROM), random access memory (RAM), other non-transitory computer-readable media, or a combination thereof. The communication interface 72 is configured to transmit and receive media and connectivity data from the plurality of communication devices 20 over the wireless network 24. In some instances, the communication interface 72 is also configured to transmit and receive media to and from a LEO satellite 12 over the satellite communication link 28. The memory 68 is configured to store the connection algorithm 44 executable by the electronic processor 64 for performing methods described herein. The memory 68 is also configured to store historical connectivity data 76 associated with currently and previously received connectivity data from the plurality of communication devices 20. The workgroup control computer 22 is also configured to predict the path of one or more of the LEO satellites 12, based on, for example, historical connectivity data 76 associated with previous passes of the one or more LEO satellites 12 over the workgroup 18. The workgroup control computer 22 may also include a user interface 80.

The workgroup control computer 22 may include more or fewer components than those illustrated in FIG. 3. Although illustrated as a separate device in FIG. 1, the workgroup control computer 22 may be included in at least one of the plurality of communication devices 20. In one example, the workgroup control computer 22 is implemented in a distributed manner in some or all of the plurality of communication devices 20. In another example, the workgroup control computer 22 is implemented in a single one of the plurality of communication devices 20. For example, the workgroup control computer 22 may be implemented in a communication device having the largest battery capacity, having the largest processing capacity, and/or having access to a power source. For example, a communication device implemented in a vehicle may have a longer battery life than, for example, a hand-held radio and the control computer is implemented on that device, for example, by installing appropriate software on that device. In some instances, the plurality of communication devices 20 collectively designate a particular one of the plurality of communication devices 20 as the workgroup control computer 22. In some instances, the workgroup control computer 22 is manually selected, for example, by a user of the workgroup 18.

Satellite communication may be affected by obstructions between a satellite and a terrestrial communication device. Additionally, because the location of LEO satellites changes over time, maintaining a satellite communication link over longer periods of time is typically not possible. Therefore, the workgroup control computer 22 determines which of the plurality of communication devices 20 has the strongest connection with a satellite based on connectivity data received from each of the plurality of communication devices 20. Rather than each of the plurality of communication devices 20 attempting to establish a satellite communication link 28 with a satellite as needed, the workgroup control computer 22 determines which of the plurality of communication devices 20 has a strongest connection with a LEO satellite.

Figure 4:
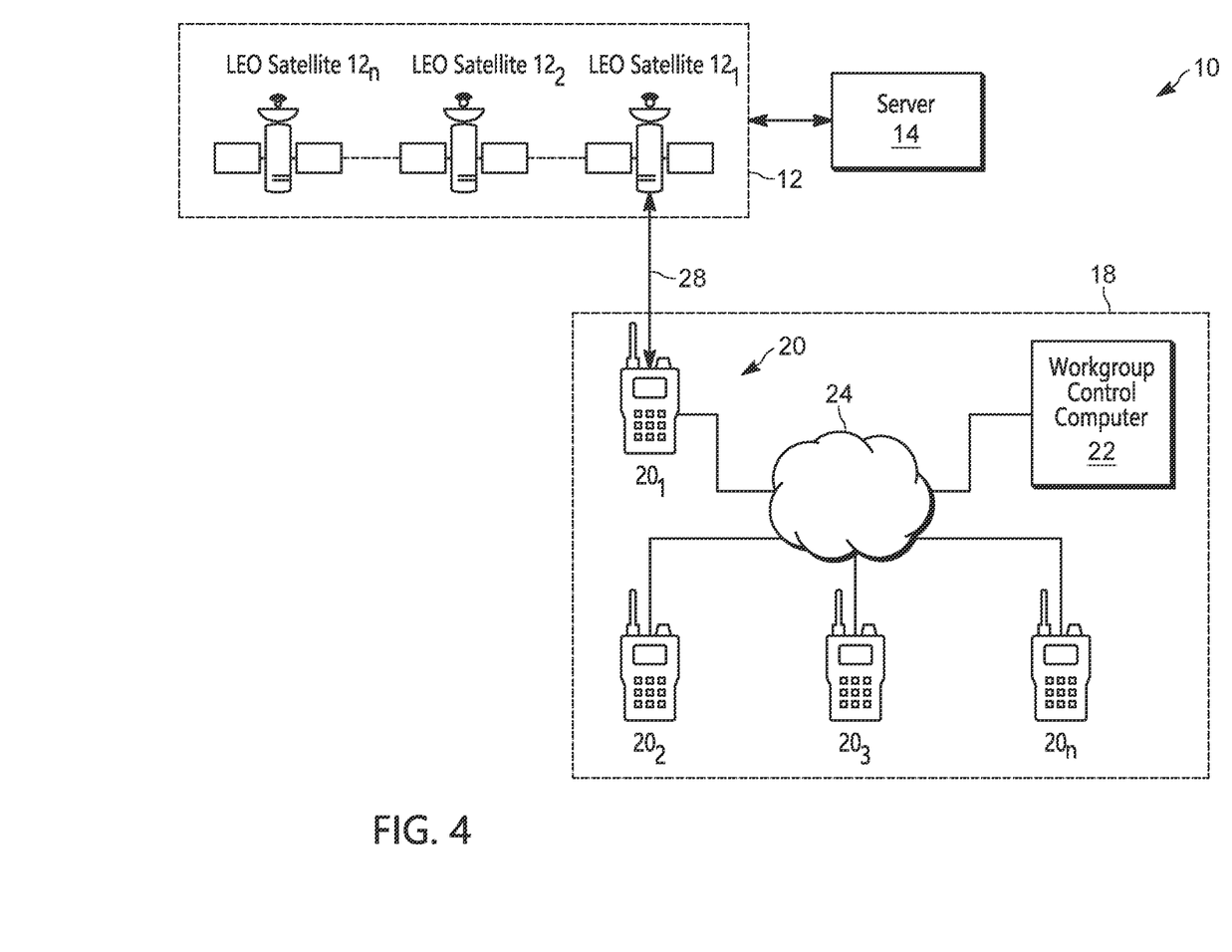
FIG. 4 illustrates a system for low earth orbit (LEO) satellite communication, according to some aspects.

Referring now to FIG. 4, the workgroup control computer 22 designates a first one of the communication devices 20 having the strongest connection to a satellite, for example, a first LEO satellite $12_1$ illustrated in FIG. 1, as a primary communication device $20_1$. The primary communication device $20_1$ is responsible for transmitting and receiving, over the satellite communication link 28, all media for the workgroup 18.

The workgroup control computer 22 may additionally select a secondary communication device $20_2$. The secondary communication device $20_2$ may have a second strongest connection to a satellite (e.g., either of the first LEO satellite $12_1$ or a second LEO satellite $12_2$ illustrated in FIG. 1). The secondary communication device $20_2$ is configured to take over the role of the primary communication device $20_1$ in the event of poor transmission or reception quality from the primary communication device $20_1$. The workgroup control computer 22 may further select a tertiary communication device $20_3$. The tertiary communication device $20_3$ may have a third strongest connection to the first LEO satellite $12_1$, the second LEO satellite $12_2$, or another LEO satellite $12_n$. The tertiary communication device $20_3$ is configured to take over the role of the primary communication device $20_1$ in the event of poor transmission or reception quality from both the primary communication device $20_1$ and the secondary communication device $20_2$. In some instances, the workgroup control computer 22 stores (e.g., in the memory 68) a tiered device list ranking each of the plurality of communication devices 20 (e.g., communication devices $20_1$-$20_n$) based on the connectivity data.

Figure 5:
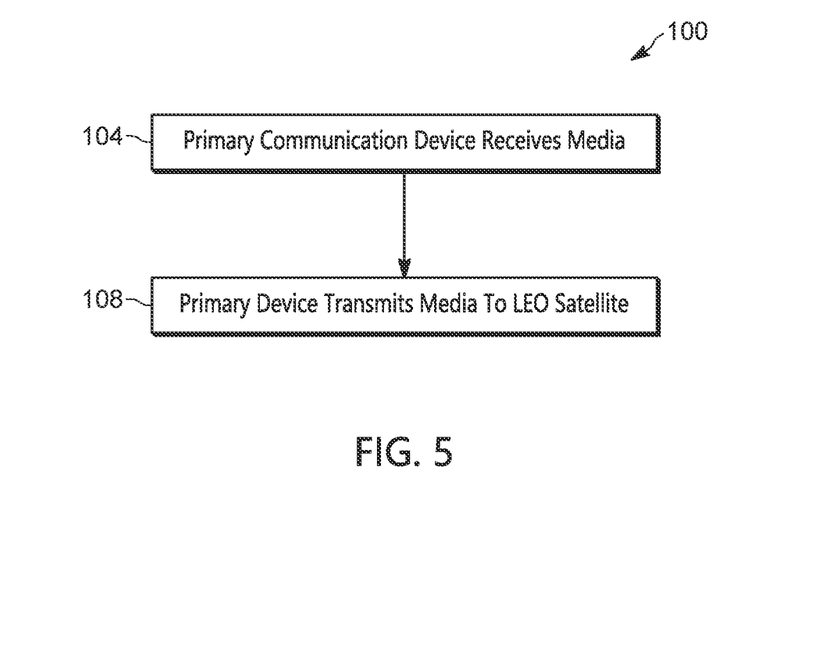
FIG. 5 illustrates a first method for performing a LEO satellite communication, according to some aspects.

FIG. 5 illustrates a method 100 performed by the primary communication device $20_1$ for transmitting media to a LEO satellite (e.g., the first LEO satellite $12_1$), according to some examples. At block 104, the primary communication device $20_1$ receives media from a different one of the plurality of communication devices 20 (e.g., the secondary communication device $20_2$) via the wireless communication network 24. The media is generated by the different one of the plurality of communication devices 20 and intended to be transmitted to one or more devices external to the system 10. The media stream is, for example, an audio stream or a video stream sent to a call dispatch center. In some instances, the primary communication device $20_1$ may receive the media directly from the different one of the plurality of communication devices 20. In some instances, the workgroup control computer 22 receives the media from the different one of the plurality of communication devices 20 over the wireless communication network 24 and sends the media to the primary communication device $20_1$ for transmission to the first LEO satellite $12_1$. In some instances, the media is generated by the primary communication device $20_1$. At block 108, after receiving the media, the primary communication device $20_1$ transmits a message (including the media) to the first LEO satellite $12_1$ with which the primary communication device $20_1$ has established a satellite communication link 28.

Figure 6:
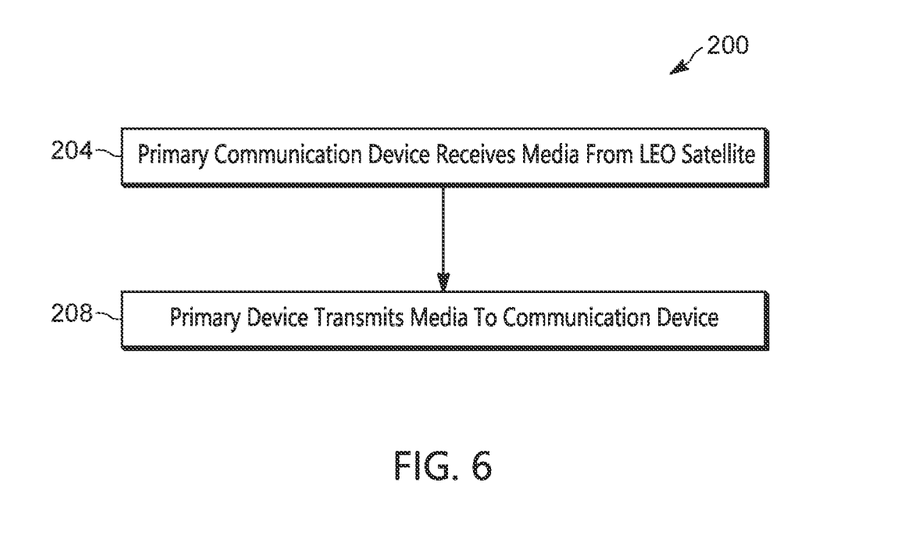
FIG. 6 illustrates a second method for performing LEO satellite communication, according to some aspects.

FIG. 6 illustrates a method 200 performed by the primary communication device $20_1$ for receiving media from a LEO satellite (e.g., the first LEO satellite $12_1$), according to some examples. At block 204 the primary communication device $20_1$ receives a message from the first LEO satellite $12_1$. The message includes media intended to be received by a particular one of the plurality of communication devices 20. At block 208, the primary communication device $20_1$ sends the media to the particular one of the plurality of communication devices 20 via the wireless network 24. In some instances, the primary communication device $20_1$ transmits the media directly to the particular one of the plurality of communication devices 20. In some instances, the primary communication device $20_1$ transmits the media to workgroup control computer 22, and the workgroup control computer 22 transmits the media to the particular one of the plurality of communication devices 20.

By selecting a particular communication device that is operable to communicate with a satellite 12 as the primary communication device $20_1$, others of the plurality of communication devices 20 are able to transmit and receive messages with the satellite 12 (e.g., via the primary communication device $20_1$) without necessarily having satellite communication capability. For example, a device not capable of performing satellite transmission may instead transmit a message to the primary communication device $20_1$, which the primary communication device $20_1$ then forwards to the first LEO satellite $12_1$.

Figure 7:
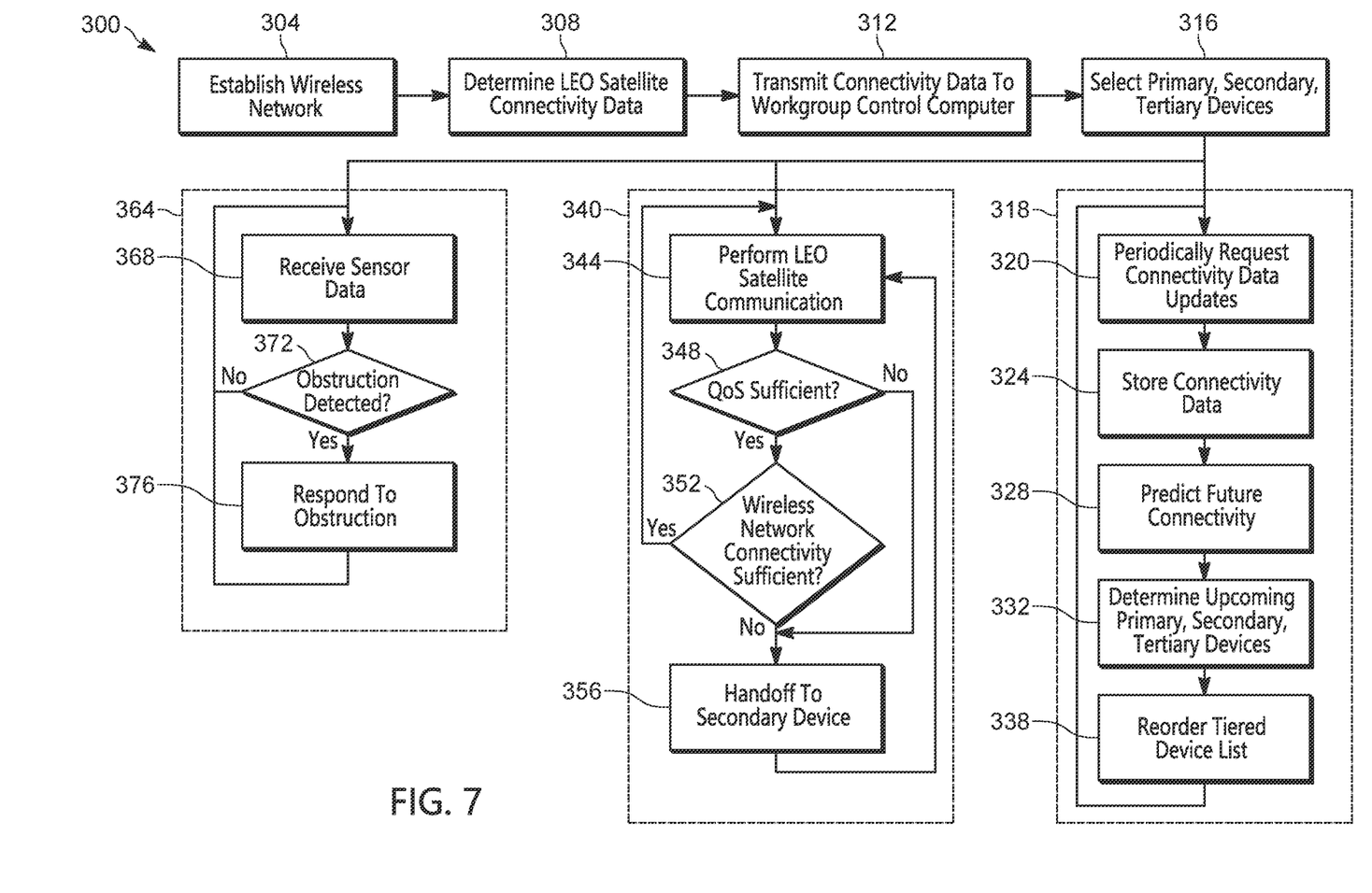
FIG. 7 illustrates a primary communication device selection method, according to some aspects.

FIG. 7 illustrates a method 300 performed by the workgroup 18 for selecting a primary communication device $20_1$, according to some examples. Although the method 300 is described in conjunction with the system 10 as described herein, the method 300 may be used with other systems and devices. For example, while the method 300 is described with respect to the plurality of communication devices 20 and the workgroup control computer 22, it should be understood that the workgroup control computer 22 may be implemented in at least one of the plurality of communication devices 20. In addition, the method 300 may be modified or performed differently than the specific example provided. For example, the order of the method described herein may be changed, and one or more method paths may be implemented in parallel with one another.

At block 304, the plurality of communication devices 20 and the workgroup control computer 22 establish the wireless network connection via the wireless network 24. At block 308, each respective communication device of the plurality of communication devices 20 determines initial connectivity data associated with a signal between the respective communication device and at least one LEO satellite 12. The LEO satellite 12 may be a satellite having a field of view including the communication device. As described above, the connectivity data may include a signal strength value associated with a signal between a respective communication device and the LEO satellite 12, a quality of service associated with the signal, a remaining connection time with the LEO satellite 12, obstruction data associated with an obstruction of the signal, or other connection metrics.

At block 312, each of the plurality of communication devices 20 transmits the connectivity data to the workgroup control computer 22 over the wireless network 24. At block 316, based on the connectivity data received from each of the plurality of communication devices 20, the workgroup control computer 22 selects a first one of the plurality of communication devices 20 as the primary communication device $20_1$. The workgroup control computer 22 may also select a second one of the plurality of communication devices 20 as the secondary communication device $20_2$ and select a third one of the plurality of communication devices 20 as the tertiary communication device $20_3$. In some instances, the workgroup control computer 22 generates, based on the connectivity data, a tiered device list ranking the connection strength of each of the plurality of communication devices 20.

After selecting the primary communication device $20_1$, the secondary communication device $20_2$, and the tertiary communication device $20_3$, the workgroup control computer 22 initiates a predictive loop 318. During the predictive loop 318, the workgroup control computer 22 periodically requests connectivity data updates from each of the plurality of communication devices 20 (in block 320). At block 324, the workgroup control computer 22 stores the connectivity data updates in the memory 68, for example, as the historical connectivity data 76. The workgroup control computer 22 may also store the first connectivity data in the memory 68 as the historical connectivity data 76. Based on the historical connectivity data 76, the workgroup control computer 22 predicts future connectivity data associated with some or all of the plurality of communication devices 20 (at block 328). The workgroup control computer 22 may include a learning module for predicting the paths of some or all of LEO satellites 12, for example, the first LEO satellite $12_1$ and the second LEO satellite $12_2$, based on the historical connectivity data 76. Alternatively, or in addition, the workgroup control computer 22 may store a data file including, for example, ephemeris data associated with some or all of the LEO satellites 12. For each respective one of the plurality of communication devices 20, the workgroup control computer 22 may predict a visibility time remaining of a LEO satellite (e.g., the first LEO satellite $12_1$), and predict an upcoming visibility of another LEO satellite (e.g., the second LEO satellite $12_2$).

Based on the predicted future connectivity data, the workgroup control computer 22 determines an upcoming primary communication device (at block 332). For example, the workgroup control computer 22 predicts which of the plurality of communication devices 20 will have the strongest connection to a LEO satellite 12 after, for example, the first LEO satellite $12_1$ moves out of the field of view of the primary communication device $20_1$. In some instances, the upcoming primary communication device is a different one of the plurality of communication devices 20 than the primary communication device $20_1$. Based on the future connectivity data, the workgroup control computer 22 may predict that the upcoming primary communication device will have the strongest connection to the first LEO satellite $12_1$. In some instances, the workgroup control computer 22 predicts, based on the future connectivity data, that the upcoming primary communication device will have the strongest connection with the second LEO satellite $12_2$. In some instances, the workgroup control computer 22 predicts that the primary communication device $20_1$ is the upcoming primary communication device, but that the primary communication device $20_1$ will have the strongest connection with the second LEO satellite $12_2$ rather than the first LEO satellite $12_1$. Similarly, the workgroup control computer 22 may also determine an upcoming secondary communication device and an upcoming tertiary communication device based on the future connectivity data.

At block 338, the workgroup control computer 22 hands off designation of the primary communication device $20_1$ to the upcoming primary communication device, designation of the secondary communication device $20_2$ to the upcoming secondary communication device, and designation of the tertiary communication device $20_3$ to the upcoming tertiary communication device. The workgroup control computer 22 may reorder the tiered device list before the satellite communication link 28 between the primary communication device $20_1$ and the first LEO satellite $12_1$ is lost. Therefore, the risk of communication interruption in the workgroup 18 is reduced. In some instances, the workgroup control computer 22 determines a specific time to perform the device handoff. After reordering the tiered device list (in block 338), the predictive loop 318 repeats.

After selecting the primary communication device $20_1$, the secondary communication device $20_2$, and the tertiary communication device $20_3$ (at block 316), the workgroup control computer 22 also initiates a watchdog loop 340 for monitoring connection quality of the primary communication device $20_1$ to the LEO satellite 12 having the strongest connection to the primary communication device $20_1$, for example, the first LEO satellite $12_1$. During the watchdog loop 340, the primary communication device $20_1$ establishes a satellite communication link 28 with the first LEO satellite $12_1$, and, at block 344, performs LEO satellite communication with the first LEO satellite $12_1$ on behalf of the workgroup 18.

During and/or after performing the LEO satellite communication, for example using the method 100 described with respect to FIG. 5 and/or the method 200 described with respect to FIG. 6, the workgroup control computer 22 determines whether the QoS associated with the communication link 28 meets or exceeds a QoS threshold. For example, during the period of time since the selection of the primary communication device $20_1$, the location of the primary communication device $20_1$ relative to the first LEO satellite $12_1$ may have changed, or an obstruction may have impacted the LoS between the primary communication device $20_1$ and the first LEO satellite $12_1$. Therefore, the workgroup control computer 22 periodically receives connectivity data associated with the satellite communication link 28 between the primary communication device $20_1$ and the first LEO satellite $12_1$.

When the workgroup control computer 22 determines that QoS associated with the communication performed by the primary communication device $20_1$ meets or exceeds the QoS threshold (in block 348), the workgroup control computer 22 determines whether the wireless network connectivity of the primary communication device $20_1$ to others of the plurality of communication devices 20 over the wireless network 24 meets or exceeds a wireless network connectivity threshold (in block 352). For example, the wireless network connection between the primary communication device $20_1$ and the others of the plurality of communication devices 20 may not be sufficiently strong to enable the primary communication device $20_1$ to transmit and receive media to and from the others of the plurality of communication devices 20.

When the workgroup control computer 22 determines that the wireless network connectivity of the primary communication device $20_1$ is below the wireless network connectivity threshold (in block 352), the workgroup control computer 22 designates the secondary communication device $20_2$ as the primary communication device $20_1$ (in block 356). In some instances, the workgroup control computer 22 may reorder the tiered device list ranking based on connectivity data periodically received from each of the plurality of communication devices 20. For example, the workgroup control computer 22 may designate the secondary communication device $20_2$ as a primary communication device, designate the tertiary communication device $20_3$ as a secondary communication device, and designate the primary communication device $20_1$ as a tertiary communication device. Similarly, when the workgroup control computer 22 determines in block 348 that the QoS of the satellite communication link 28 between the initially assigned primary communication device $20_1$ and the first LEO satellite $12_1$ does not meet or exceed the QoS threshold (in block 348), the workgroup control computer 22 designates the secondary communication device $20_2$ as the primary communication device $20_1$ (in block 352). After the workgroup control computer 22 assigns the secondary communication device $20_2$ as a primary communication device $20_1$ (in block 352), the watchdog loop 340 repeats and the new primary communication device $20_1$ performs LEO satellite communication (in block 344).

When the workgroup control computer 22 determines that the QoS associated with the satellite communication link 28 meets or exceeds the QoS threshold (in block 348) and that the network connectivity meets or exceeds the network connectivity threshold (in block 352), the watchdog loop 340 does not proceed to block 356. Instead, the watchdog loop 340 proceeds to block 344, and the initially assigned primary communication device $20_1$ continues to perform LEO satellite communication on behalf of the workgroup 18.

In the example provided, the method 300 additionally includes a sensor loop 364. During the sensor loop 364, the workgroup control computer 22 receives sensor data from some or all of the plurality of communication devices 20 (at block 368). The sensor data may include image data, such as for example a video stream, generated by the camera of one or more of the plurality of communication devices 20. The workgroup control computer 22 may perform video analytics on the sensor data and determine whether an obstruction is detected in the LoS of a particular communication device (at block 372). For example, based on the sensor data, the workgroup control computer 22 may determine that the environment surrounding the primary communication device $20_1$ includes an obstruction (e.g., foliage, buildings, etc.) in the LoS of the primary communication device $20_1$ and the first LEO satellite $12_1$. Alternatively, or in addition, each respective one of the plurality of communication devices 20 performs an obstruction analysis on respective sensor data, and transmits a result of the analysis to the workgroup control computer 22. For example, a particular one of the plurality of communication devices 20 may determine that the particular communication device has a 20% obstruction with a satellite.

The sensor data may be generated at the primary communication device $20_1$, or at a different one of the plurality of communication devices 20 having a view of the primary communication device $20_1$. In some instances, the workgroup control computer 22 predicts a satellite LoS obstruction based on, for example, the sensor data and the predicted path of the first LEO satellite $12_1$. The workgroup control computer 22 may also determine an obstruction for the secondary communication device $20_2$ and the tertiary communication device $20_3$. In some instances, the workgroup control computer 22 is configured to determine an obstruction for each of the plurality of communication devices 20. In some instances, the workgroup control computer 22 includes a learning module for predicting an obstruction based on previously received sensor data.

If the workgroup control computer 22 does not detect an obstruction or an upcoming obstruction, the sensor loop returns to block 368 and repeats. If, on the other hand, the workgroup control computer 22 does determine an obstruction or an upcoming obstruction in the LoS of, for example, the primary communication device $20_1$ and the first LEO satellite $12_1$, the workgroup control computer 22 determines a control response based on the obstruction (at block 376). In some instances, the control response includes performing a handoff of the primary communication device $20_1$. For example, the workgroup control computer 22 may reorder the tiered device list and reassign the primary communication device $20_1$, the secondary communication device $20_2$, and/or the tertiary communication device $20_3$. In some instances, such as when each of the plurality of communication devices 20 has a poor connection with the LEO satellites 12 or when only the primary communication device $20_1$ is otherwise available, the control response includes determining an unobstructed location within a vicinity (e.g., within 10 feet of the primary communication device $20_1$, within 50 feet of the primary communication device $20_1$, within a mile of the primary communication device $20_1$, or another suitable distance from the primary communication device $20_1$). The workgroup control computer 22 transmits a message to the primary communication device $20_1$ via the wireless network connection. In some examples, the message includes instructions for a user of the primary communication device $20_1$ to move to the unobstructed location. The instructions may include a suggested route for the user of the primary communication device $20_1$ to reach the unobstructed location.

In some instances, the workgroup control computer 22 determines an upcoming primary communication device, an upcoming secondary communication device, and/or an upcoming tertiary communication device based on the determined obstruction. In some instances, the workgroup control computer 22 provides a command to the primary communication device $20_1$ to establish a satellite communication link 28 with the second LEO satellite $12_2$ rather than the first LEO satellite $12_1$. Although described herein as a separate loop, the sensor loop 364 may alternatively be implemented as part of one or both of the predictive loop 318 and the watchdog loop 340.

Figure 8:
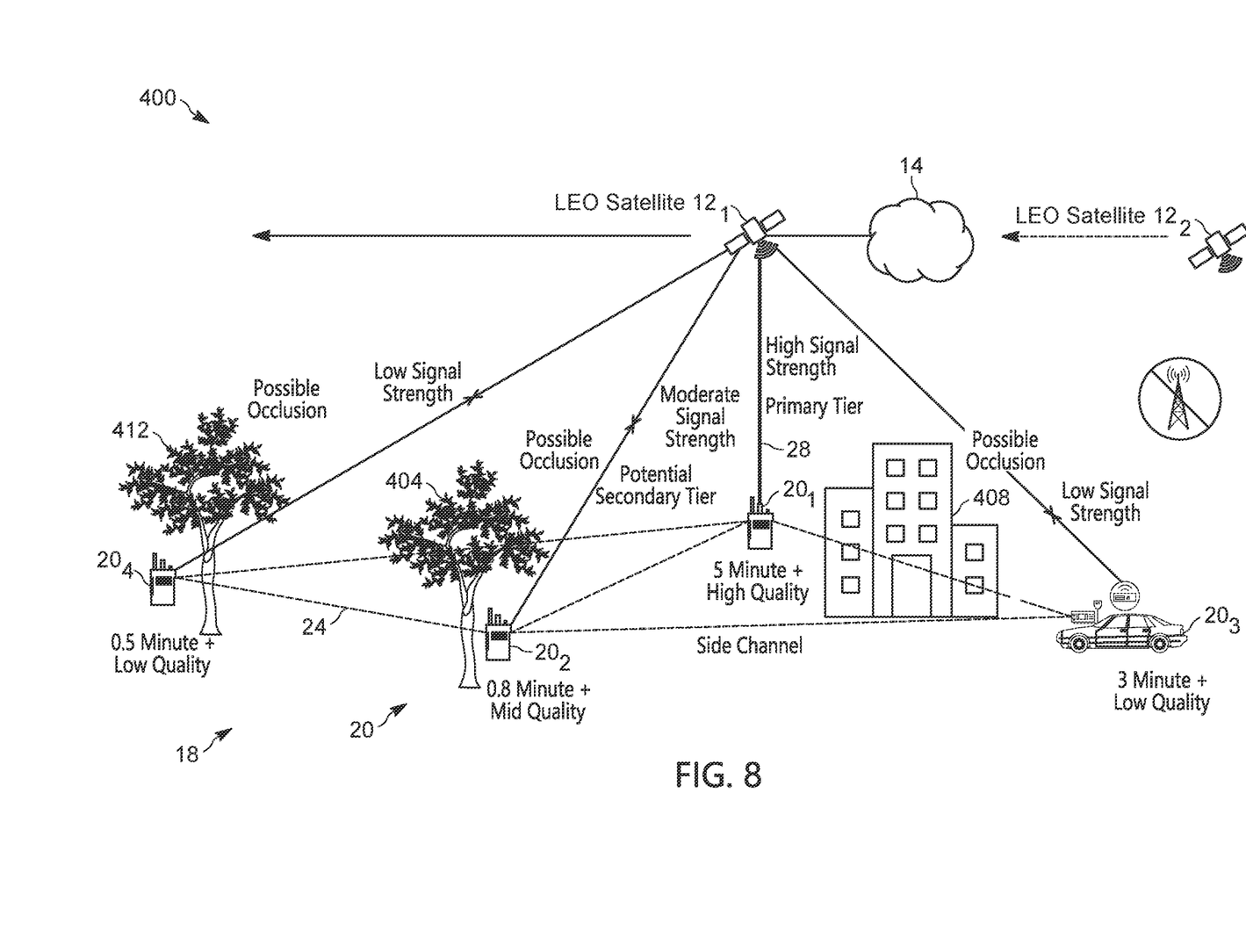
FIG. 8 illustrates a LEO satellite communication environment, according to some aspects.

FIG. 8 illustrates an example environment 400 in which the system 10 may be implemented. As described above, a workgroup control computer may be implemented in at least one of the plurality of communication devices 20. In the illustrated example, each of the plurality of communication devices 20 are in the field of view of the first LEO satellite $12_1$. The primary communication device $20_1$ experiences high signal strength from the first LEO satellite $12_1$ and may be operable to deliver 5 minutes of high QoS transmission and reception of media with the first LEO satellite $12_1$. The secondary communication device $20_2$ experiences a moderate signal strength from the first LEO satellite $12_1$ due to an occlusion from a first obstruction 404. In the illustrated example, the secondary communication device $20_2$ may be operable to deliver 0.8 minutes of moderate QoS transmission and reception of media with the first LEO satellite $12_1$. The tertiary communication device $20_3$ experiences a low signal strength from the first LEO satellite $12_1$ due to an occlusion from a second obstruction 408. In the illustrated example, the tertiary communication device $20_3$ may be operable to deliver 3 minutes of low quality transmission and reception of media with the first LEO satellite $12_1$. A fourth, or quaternary communication device $20_4$ may experience low signal strength from the first LEO satellite $12_1$ due to occlusion from a third obstruction 412. In the illustrated example, the quaternary communication device $20_4$ may be operable to deliver 0.5 minutes of low quality transmission and reception of media with the first LEO satellite $12_1$.

In the foregoing specification, specific examples have been described. However, one of ordinary skill in the art appreciates that various modifications and changes can be made without departing from the scope of the claimed subject matter. For example, in some instances, the workgroup control computer 22 may be at least partially implemented in the cloud, such as cloud-based server 14. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for low earth orbit (LEO) satellite communication, the system comprising:
a control computer; and
a workgroup including a plurality of communication devices, the plurality of communication devices including a camera-equipped communication device including a camera configured to capture image data of an environment surrounding the camera-equipped communication device;
wherein each respective communication device of the plurality of communication devices includes an electronic processor configured to:
establish a wireless network connection with the control computer,
determine connectivity data associated with a signal between the respective communication device and a first LEO satellite, and
transmit the connectivity data to the control computer via the wireless network connection;
wherein the control computer is configured to:
receive the connectivity data from each communication device of the plurality of communication devices, and
select a first one of the plurality of communication devices as a primary communication device based on each of the connectivity data,
periodically receive connectivity data updates from each communication device of the plurality of communication devices,
store each of the connectivity data updates,
predict future connectivity data for each communication device of the plurality of communication devices based on the connectivity data updates,
select a second one of the plurality of communication devices as an upcoming primary communication device based on the future connectivity data, and
receive, from the camera-equipped communication device, sensor data based on the image data, and determine a satellite line-of-sight (LoS) obstruction based on the sensor data;
wherein the primary communication device is configured to:
establish a communication link with the first LEO satellite,
receive media from a different one of the plurality of communication devices via the wireless network connection, and
transmitting the media to the first LEO satellite.

2. The system of claim 1, wherein the control computer is included in at least one of the plurality of communication devices.

3. The system of claim 1, wherein selecting the first one of the plurality of communication devices as the primary communication device includes determining, based on the connectivity data, that the first one of the plurality of communication devices is in a field of view of the first LEO satellite.

4. The system of claim 1, wherein the future connectivity data includes a predicted visibility time of a second LEO satellite to the upcoming primary communication device, and the control computer is further configured to transmit a command to the upcoming primary communication device to establish a communication link with the second LEO satellite.

5. The system of claim 1, wherein the connectivity data includes at least one selected from the group consisting of a signal strength of the signal between the respective communication device and the first LEO satellite, a quality of service (QoS) of the signal between the respective communication device and the first LEO satellite, an estimated remaining connection time with the first LEO satellite, and obstruction data.

6. The system of claim 5, wherein the control computer is further configured to
select a second one of the plurality of communication devices as a secondary communication device based on the connectivity data,
periodically receive connectivity data updates from the plurality of communication devices,
determine, based on the connectivity data updates, whether the QoS between the primary communication device and the first LEO satellite meets a QoS threshold,
in response to determining, based on the connectivity data, that the QoS between the primary communication device and the first LEO satellite is below the QoS threshold, select the secondary communication device as the primary communication device.

7. The system of claim 6, wherein selecting the secondary communication device as the primary communication device includes transmitting a command to the secondary communication device to establish a communication link with a second LEO satellite, wherein the secondary communication device is in a field of view of the second LEO satellite.

8. The system of claim 1, wherein the wireless network connection includes at least one selected from the group consisting of a Wi-Fi connection, a Bluetooth connection, an 802.15.4g connection, a land mobile radio (LMR) connection, an ultra-wideband (UWB) connection, and a long term evolution (LTE) direct connection.

9. The system of claim 1, wherein the satellite line-of-sight obstruction includes a predicted satellite LoS obstruction, and the control computer is configured to
predict a path of the first LEO satellite and determine the predicted satellite LoS obstruction based on a predicted path of the first LEO satellite.

10. The system of claim 1, wherein the control computer is configured to
in response to determining the satellite LoS obstruction, determine, based on the image data and a predicted path of the first LEO satellite, an unobstructed location, and
transmit a message to the primary communication device, the message including instructions for a user of the primary communication device to move to the unobstructed location.

11. The system of claim 1, wherein the control computer is configured to
predict a path of a second LEO satellite, and
in response to determining the satellite LoS obstruction, transmit a command to the primary communication device to establish a communication link with the second LEO satellite.

12. The system of claim 1, wherein the control computer is configured to
in response to determining the satellite LoS obstruction, select a second one of the plurality of communication devices as an upcoming primary communication device.

13. A method for low earth orbit (LEO) satellite communication, the method comprising:
- establishing, with each respective communication device of a plurality of communication devices, a wireless network connection with a control computer;
- determining, with each respective communication device of a plurality of communication devices, connectivity data associated with a signal between the respective communication device and a first LEO satellite;
- transmitting, with each respective communication device of the plurality of communication devices, the connectivity data to the control computer via the wireless network connection;
- receiving, with the control computer, the connectivity data from each communication device of the plurality of communication devices;
- selecting, with the control computer, a first one of the plurality of communication devices as a primary communication device based on each of the connectivity data;
- periodically receiving, with the control computer, connectivity data updates from each communication device of the plurality of communication devices,
- storing, with the control computer, each of the connectivity data updates,
- predicting with the control computer, future connectivity data for each communication device of the plurality of communication devices based on the connectivity data updates, and
- selecting with the control computer, a second one of the plurality of communication devices as an upcoming primary communication device based on the future connectivity data;
- receiving, from a camera-equipped communication device of the plurality of communication devices, sensor data based on the image data, and determine a satellite line-of-sight (LoS) obstruction based on the sensor data;
- establishing, with the primary communication device, a communication link with the first LEO satellite;
- receiving, with the primary communication device, media from a different one of the plurality of communication devices via the wireless network connection; and
- transmitting, with the primary communication device, the media to the first LEO satellite.

14. The method of claim 13, wherein the control computer is included in at least one of the plurality of communication devices.

15. The method of claim 13, wherein selecting the first one of the plurality of communication devices as the primary communication device includes determining, based on the connectivity data, that the first one of the plurality of communication devices is in a field of view of the first LEO satellite.

16. The method of claim 13, wherein the future connectivity data includes a predicted visibility time of a second LEO satellite to the upcoming primary communication device, and the method further comprises transmitting, with the control computer, a command to the upcoming primary communication device to establish a communication link with the second LEO satellite.

17. The method of claim 13, wherein the connectivity data includes at least one selected from the group consisting of a signal strength of the signal between the respective communication device and the first LEO satellite, a quality of service (QoS) of the signal between the respective communication device and the first LEO satellite, an estimated remaining connection time with the first LEO satellite, and obstruction data.

18. The method of claim 13, wherein the satellite line-of-sight obstruction includes a predicted satellite LoS obstruction, further comprising:
- predicting a path of the first LEO satellite and determine the predicted satellite LoS obstruction based on a predicted path of the first LEO satellite.

19. The method of claim 13, further comprising:
- in response to determining the satellite LoS obstruction, determining, based on the image data and a predicted path of the first LEO satellite, an unobstructed location, and
- transmitting a message to the primary communication device, the message including instructions for a user of the primary communication device to move to the unobstructed location.

20. The method of claim 13, further comprising:
- predicting a path of a second LEO satellite, and
- in response to determining the satellite LoS obstruction, transmit a command to the primary communication device to establish a communication link with the second LEO satellite.

* * * * *